No. 702,657. Patented June 17, 1902.
B. G. LAMME.
SPEED REGULATING MEANS FOR ELECTRIC MOTORS.
(Application filed Apr. 30, 1901.)
(No Model.)
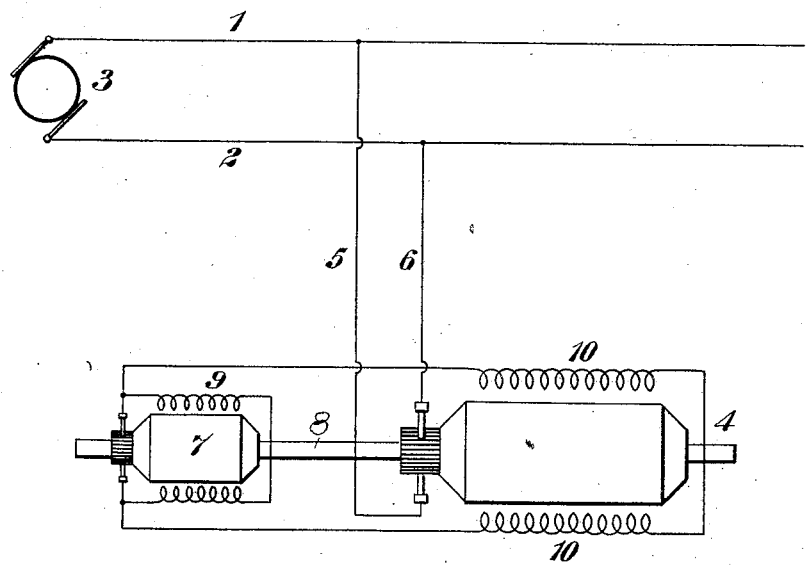
WITNESSES:
C. H. Belcher
J. C. Morse
INVENTOR
Benjamin G. Lamme
BY
Attorney.

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING CO., A CORPORATION OF PENNSYLVANIA.

SPEED-REGULATING MEANS FOR ELECTRIC MOTORS.

SPECIFICATION forming part of Letters Patent No. 702,657, dated June 17, 1902.

Application filed April 30, 1901. Serial No. 58,207. (No model.)

*To all whom it may concern:*

Be it known that I, BENJAMIN G. LAMME, a citizen of the United States, residing at Pittsburg, in the county of Allegheny and State of Pennsylvania, have invented new and useful Improvements in Speed-Regulating Means for Electric Motors, of which the following is a specification.

My invention relates to the utilization of electrical energy, and particularly to means for automatically regulating the speed of direct-current electric motors.

The object of my invention is to provide means whereby direct-current motors which are operated from sources of variable electromotive force may be operated at approximately constant speed.

The single figure of the accompanying drawing is a diagram illustrating a direct-current circuit of variable electromotive force, a motor operated therefrom, and means for automatically adjusting the field-magnet excitation of the motor to insure an approximately constant speed.

It not infrequently becomes necessary to operate motors from a circuit of variable electromotive force, and when it is desired to operate motors at approximately constant speed when supplied with energy from such a source it is necessary to provide some auxiliary regulating means. Such a means I have shown in the drawing and will now describe.

The work-circuit 1 and 2 is supplied with energy from a direct-current generator 3, and it will be assumed that by reason of the character of the generator or by the conditions of service the electromotive force on the mains 1 and 2 is to a greater or less extent variable.

The motor 4, which is driven by the energy received from the mains 1 and 2 through conductors 5 and 6, will obviously vary in speed as the electromotive force varies unless some regulating means are employed to counteract the effect of electromotive-force fluctuations. In order to insure an approximately constant speed, I therefore mechanically connect the armature 7 of a small direct-current generator to the armature of the motor 4. As here indicated, the two armatures are mounted upon a single shaft 8; but obviously they may be upon separate shafts, suitably coupled or geared together by any well-known means.

The exciting-generator is provided with a field-magnet that under normal conditions of operation is worked well below saturation, and, as here indicated, is provided with a shunt-winding 9, though not limited to this type of winding.

The generator is indicated as supplying the entire magnetizing-current for the field-magnet windings 10 of the motor 4 in order that it may exercise a maximum degree of control over the operation of the motor.

The generator field-magnet being, as above stated, worked well below saturation, any change in the speed of rotation of its armature by reason of variations in the electromotive force supplied to the motor-armature will build up or cut down the field magnetization of the generator to a greater degree than would be the case if the field-magnet were saturated. The exciter will consequently vary the excitation of the field-magnet of the motor to a corresponding degree, and thus serve to maintain the speed approximately constant.

I claim as my invention—

1. The combination with a source of direct-current electromotive force, of a direct-current motor driven by energy from said source and having a separately-excited field-magnet, a generator having a self-excited and normally unsaturated field-magnet and driven by said motor for supplying current to the motor-field-magnet winding.

2. The combination with an electric motor driven from a source of variable electromotive force, of a generator having a self-excited and normally unsaturated field-magnet and driven by the motor to supply its field-magnet winding with exciting-current.

3. The combination with an electric motor driven from a source of variable electromotive force, of an exciting-generator for the field-magnet of the motor having a self-excited and normally unsaturated field-magnet and having its armature mechanically connected to the motor-armature.

4. The combination with an electric motor driven from a source of variable electromotive force, of an exciting-generator therefor having a self-excited and normally unsaturated field-magnet and driven by said motor, whereby the motor is operated at approximately constant speed.

5. The combination with an electric motor driven from a source of variable electromotive force, of an exciting-generator therefor having a self-excited and normally unsaturated field-magnet and having its armature coupled to that of the motor, whereby the field of the motor is adjusted to maintain an approximately constant speed.

In testimony whereof I have hereunto subscribed my name this 29th day of April, 1901.

BENJ. G. LAMME.

Witnesses:
WESLEY G. CARR,
BIRNEY HINES.